June 14, 1949.　　　K. L. EMBERSON　　　2,473,365
SEAT
Filed Aug. 6, 1946
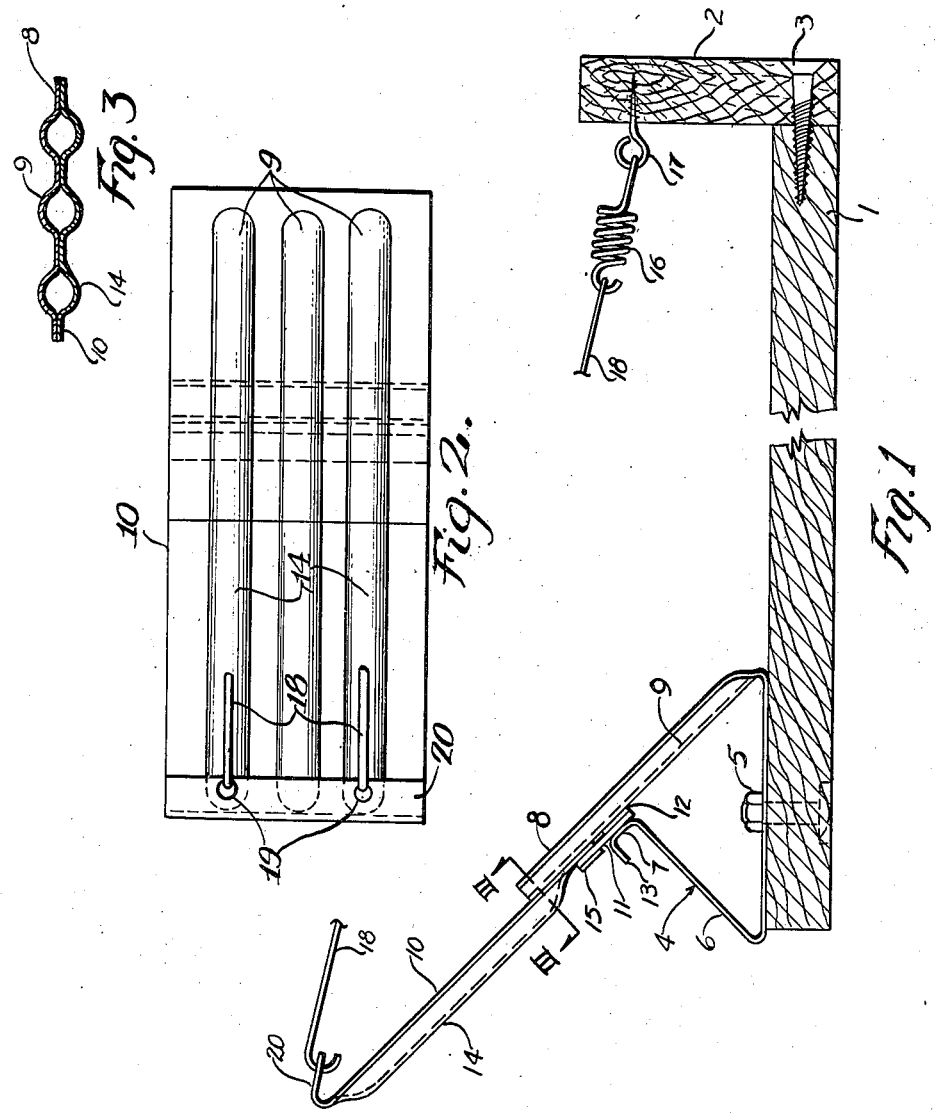
INVENTOR.
KEITH L. EMBERSON
BY
ATTORNEY Patented June 14, 1949

2,473,365

UNITED STATES PATENT OFFICE 2,473,365

SEAT

Keith L. Emberson, Akron, Ohio, assignor to Wingfoot Corporation, Akron, Ohio, a corporation of Delaware Application August 6, 1946, Serial No. 688,639

9 Claims. (Cl. 155—179)

1

This invention relates to seats, especially to seats having a load receiving surface one edge portion of which is supported by pivotally acting means.

Appreciable interest has been shown recently in seats wherein the front edge portion of the seat, if horizontally positioned, or the lower or upper edge of the seat if vertically positioned, are supported by pivotally mounted lever arms which carry a load receiving member, or members. Suitable spring means are normally associated with the load receiving member or members to draw the free ends of the levers upwardly and aid in supporting load on such member. The load receiving member or members may be of any desired construction and carry suitable cushioning material, if desired. In all events, the free ends of the lever arms (on a horizontally positioned seat) are moved downwardly and outwardly of the seat when the seat is loaded and consequently will spring or be drawn upwardly when the load is removed from the seat. In the past, various types of tie straps have been secured to the free ends of the lever arms to limit their upward movement but they have not been entirely satisfactory due to the labor involved in tying the straps to the lower arms, and, primarily, to the fact that the tying down is not definitely a permanent, or lasting construction.

The general object of this invention is to avoid and overcome the foregoing, and other disadvantages of and objections to known types of seat constructions of the class described and to provide a simplified seat construction embodying supporting lever arms which have permanently limited movement.

Another object of the invention is to provide an inexpensive, easily assembled seat that is provided with a constant no-load position.

Another object of the invention is to provide the bracket pivotally supporting the lever arm with cantilever stop means limiting the movement of the lever arm around the bracket.

The foregoing objects of the invention, and other objects and advantages which will become apparent as the specification proceeds, are achieved by the provision of a mounting bracket adapted to be secured to a support, a flat spring member having one end secured to the bracket, a lever arm secured to the free end of the spring member to extend outwardly from the bracket, means integral with the bracket for limiting movement of the lever arm in one direction about the bracket, and a seating surface carried at one end by the lever arm.

2

Reference should be had to the accompanying drawings, wherein:

Fig. 1 is a transverse section of a seat embodying the principles of the invention;

Fig. 2 is a plan of the mounting bracket of Fig. 1; and

Fig. 3 is a cross-sectional view taken on line III—III of Fig. 1.

Referring now in detail to the seat shown in the drawings, a suitable seat frame, which obviously may take a variety of forms, but which for sake of simplicity has been shown as wooden base 1 and a wooden upright 2 secured thereto by screws 3. A mounting bracket, indicated as a whole by the numeral 4, is secured to the base 1 as by bolts 5. The bracket is preferably made of a single piece of sheet metal and comprises a substantially triangular, open centered base 6 which has normally integral arms 7 and 8 extending upwardly and outwardly therefrom at the apex of the triangle. The bracket 4 may be of any desired length and width with relation to the length and width of the base 1. A prime feature of the invention resides in forming the arm 8 appreciably longer than the arm 7 for a reason to be explained hereinafter. In order to reenforce and strengthen the arm 8, a plurality of corrugation 9 which extend lengthwise of the arm as shown in Fig. 2, are formed in the arm and may be continued down the side of the base 6, as shown.

The bracket 4 serves as a pivotal support for a lever arm 10, and the exact means for pivotally connecting the lever arm and bracket may take a variety of forms. One convenient manner of achieving the pivotal connection is to provide a spring support for the lever arm. This is achieved by securing, as by spot welding, a flat metal spring 11 of any suitable composition between the arms 7 and 8 at the apex of the bracket 4. A shim 12 may be placed between the arm 8 and the spring 11 before securing the spring in position so that the spring is spaced slightly from the under surface of the arm to enable the lever 10 to be positioned on the spring and flush against the under surface of the arm 8. Note that the spring 11 extends upwardly and outwardly of the bracket 4 and substantially parallel to the arm 8. A reenforcing flange 13 may be formed at the end of the arm 7. The lever arm 10 is secured in any suitable way to the outer end of the spring 11, but so that the arm 10 normally lies flush against the under surface of the arm 8 whereby the upward movement of the arm is positively and permanently limited, or controlled.

Strengthening channels 14 may be formed in the arm 10, if desired. It should be observed that the lower end of the lever arm 10 is spaced slightly from the upper edge of the shim 12 and that a reenforcing bar 15 on the lower surface of the spring 11 is similarly positioned to provide space for arcuate movement of the free end of the spring and of the lever arm.

The invention includes a load receiving or resting member that has its front edge supported by the lever arm 10, and its back end engaging coil springs 16 carried by screw eyes 17 mounted on the upright 2. The load receiving and resting member may be canvas, glass fabric, wire netting, or the like. A satisfactory member characterized by lightness, inexpensiveness, and high strength is straight wire 18 which is suitably secured to the free end of the lever arm 10, as by engaging with a hole 19 in a backwardly-turned flange 20 thereon. Two or more of such spring supported wires may connect to each lever arm 10. It will be understood that a plurality of such springs, wires and lever arms are positioned along the width of a seat to form by themselves alone, or combined with other means, a load carrying or resting member that has one edge supported by a plurality of lever arms supported as is the lever arm 10. The coil springs 16 are ordinarily tensioned so that when no load is on the load receiving member the arms 10 are drawn up against the under surface of the arm 8 of the bracket 4 to thereby allow for preloading the seat structure.

From the foregoing it is seen that the resiliently supported lever arms of the invention have a definite and fixed no load position which will remain constant throughout the life of the seat. Also, it will be understood that the invention herein disclosed and claimed may be employed for seat bottoms or backs, and on automobile, theater, railroad or furniture seats.

The teachings of the invention can be used, of course, with any type of a movable lever arm of the type used in supporting a load carrying member and, while a spring mounted arm is disclosed, the arm may be pivotally, or movably mounted by any suitable means. Likewise, it is preferred to have the motion limiting member contact the lever over a distance of several inches but still the invention contemplates the use of a bar or rod as a motion limiting member where the bar or rod is positioned by the support to contact the lever arm over a small area at a point remote from its hinge point.

While a presently preferred embodiment of the invention has been illustrated and described in detail, it will be understood that the scope of the invention is not limited to the forms and details disclosed herein but is commensurate with the breadth of the appended claims.

I claim:

1. In a seat, a base member, an open centered substantially triangular bracket member secured to said base member, said bracket member being formed from an integral sheet the ends of which are bent to extend upwardly and outwardly beyond the apex of the bracket to form two superimposed positioning arms, a flat spring member secured to the lower of said positioning arms and extending therefrom outwardly and upwardly of said bracket member, and a lever arm having a plurality of reenforcing corrugations formed therein secured to the upper surface of said spring member and projecting therefrom immediately under and normally flush against the undersurface of said upper positioning arm, said lever arm extending upwardly and outwardly from said bracket member and being adapted to be connected to a load receiving member of the seat whereby said lever arm will be moved downwardly by load applied to the seat but will be retained against unlimited upward movement by the upper of said positioning arms.

2. In a seat, a base member, an open centered substantially triangular bracket member secured to said base member, said bracket member having a plurality of longitudinally extending corrugations formed in one side thereof which projects beyond the apex of the triangular portion of the bracket, a flat spring member secured to said bracket at the apex thereof and extending upwardly and outwardly therefrom below and spaced from said projecting side, and a lever arm secured to the upper surface of said spring member and projecting therefrom immediately under and normally flush against the undersurface of said projecting side of said bracket member, said lever arm extending upwardly and outwardly from said bracket member and being adapted to be connected to a load receiving member of the seat whereby said lever arm will be forced downwardly by load applied to the seat but will be retained against more than a predetermined degree of upward movement by said projecting side of said bracket member.

3. In a seat, a base member, a sheet metal bracket member secured to said base member, said bracket member having one side thereof which projects beyond the remainder of the bracket, a flat spring member secured at one end to said bracket and extending from said bracket below and spaced from said projecting side, and a lever arm secured to the free end of said spring member adjacent one end thereof and projecting therefrom under and substantially flush against the undersurface of said projecting side of said bracket member, said lever arm extending upwardly and outwardly from said bracket member and being adapted to be connected to a load receiving member of the seat whereby said lever arm will be forced downwardly and outwardly by load applied to the seat but will be retained against more than a predetermined degree of upward movement by said projecting side of said bracket member.

4. In a seat, a bracket member having a plurality of longitudinally extending corrugations formed in one side thereof which projects beyond the remainder of the bracket, a flat spring member secured to said bracket and extending therefrom below and spaced from said projecting side, and a lever arm secured to said spring member and projecting therefrom immediately under and substantially flush against the undersurface of said projecting side of said bracket member.

5. In a seat construction, a support member, a flat spring member secured to said support member for spring movement, a lever arm mounted by said spring member and extending upwardly and outwardly with relation to said support member, and means fixedly associated with said support member and extending upwardly and outwardly therefrom immediately above said lever arm to limit the upward movement of said lever arm.

6. In a seat construction, a support member, a shim member, a flat spring member secured at one end to said support member with said shim member being interposed therebetween, said spring member having one end thereof extending from said support member, and a lever arm secured at one end to the upper surface of said spring member adjacent the free end thereof, said support member having a section extending therefrom above and flush against the upper surface of a portion of said lever arm adjacent its connection to said spring member.

7. In combination in a seat, a flexible resting portion, a base, bracket means mounted adjacent the front edge of the base, lever means pivotally secured to the bracket means and extending upwardly and outwardly therefrom, means integral with the bracket means for limiting the upward movement of the lever means, said resting portion being secured adjacent its front edge to the upper end of the lever means, and resilient means securing the back edge of the resting portion to the base and holding the lever means resiliently against the limiting means on the bracket means.

8. In combination in a seat, a flexible resting portion, a base, bracket means mounted adjacent the front edge of the base, lever means pivotally secured to the bracket means and extending upwardly and outwardly therefrom, means for limiting the upward movement of the lever means, said resting portion being secured adjacent its front edge to the upper end of the lever means, and resilient means securing the back edge of the resting portion to the base and holding the lever means resiliently against the limiting means.

9. In combination in a seat, a flexible wire resting portion, a support frame bracket means mounted adjacent one side of the support frame, lever means pivotally secured to the bracket means, coil springs securing one edge of the resting portion to the frame, the opposite edge of the resting portion being secured to the lever means, and extension means on the bracket means for limiting the pivotal movement of the lever means in the direction of pull of the coil springs.

KEITH L. EMBERSON.

REFERENCES CITED

The following references are of record in the file of this patent:

UNITED STATES PATENTS

| Number | Name | Date |
|---|---|---|
| 468,398 | Sherman | Feb. 9, 1892 |
| 1,586,740 | Heck | June 1, 1926 |
| 1,981,579 | Bennet | Nov. 20, 1934 |
| 2,329,572 | Young | Sept. 14, 1943 |

FOREIGN PATENTS

| Number | Country | Date |
|---|---|---|
| 157,891 | Switzerland | Jan. 2, 1933 |